United States Patent [19]
Mukarovsky et al.

[11] 4,064,838
[45] Dec. 27, 1977

[54] AUTOMATIC MILKING SYSTEMS

[75] Inventors: Ladislav Mukarovsky; Artur Novak; Felix Kretschmer, all of Prague, Czechoslovakia

[73] Assignee: Ustredni statni veterinarni ustav, Prague, Czechoslovakia

[21] Appl. No.: 681,686

[22] Filed: Apr. 29, 1976

[30] Foreign Application Priority Data
Apr. 29, 1975 Czechoslovakia .................... 2969/75

[51] Int. Cl.² ................................................ A01J 7/00
[52] U.S. Cl. .............................. 119/14.08; 119/14.14
[58] Field of Search ............................ 119/14.08, 14.14

[56] References Cited
U.S. PATENT DOCUMENTS

| | | | |
|---|---|---|---|
| 3,773,016 | 11/1973 | Needham et al. | 119/14.08 |
| 3,878,819 | 4/1975 | Harman | 119/14.08 |
| 3,884,187 | 5/1975 | Massie et al. | 119/14.14 |

*Primary Examiner*—Hugh R. Chamblee

[57] ABSTRACT

The suction-operated teat cups of an automatic milking system are associated with a multiple detector which yields a plurality of output signals individually indicative of (1) the milk flow rate after suction is applied to the teat cups, (2) the electrical conductivity of the flowing milk and (3) the temperature of the flow. The signal indicative of the flow rate is coupled to the input of a threshold-operated amplifier, which provides an output pulse to the input of a delay circuit when the signal indicative of the flow rate falls below a predetermined value. The retardation time of the delay circuit is chosen larger than the normal habitual start interval of the animal being milked, so that such delay circuit passes the output control pulse from the threshold device only if the diminution in flow is truly representative of a corresponding cessation of milk during steady state flow. The delayed control pulse is applied to a suction regulator for the teat cups to terminate the suction on the milk glands. The multiple detector is associated with an operational amplifier and with a temperature correction circuit to provide a corrected indication of the instantaneous electrical conductivity of the milk; when such conductivity falls outside a predetermined range, the suction on the teat cups is likewise terminated. The outputs of the delay circuit and the conductivity comparator are also coupled to separate portions of an alarm circuit.

3 Claims, 1 Drawing Figure

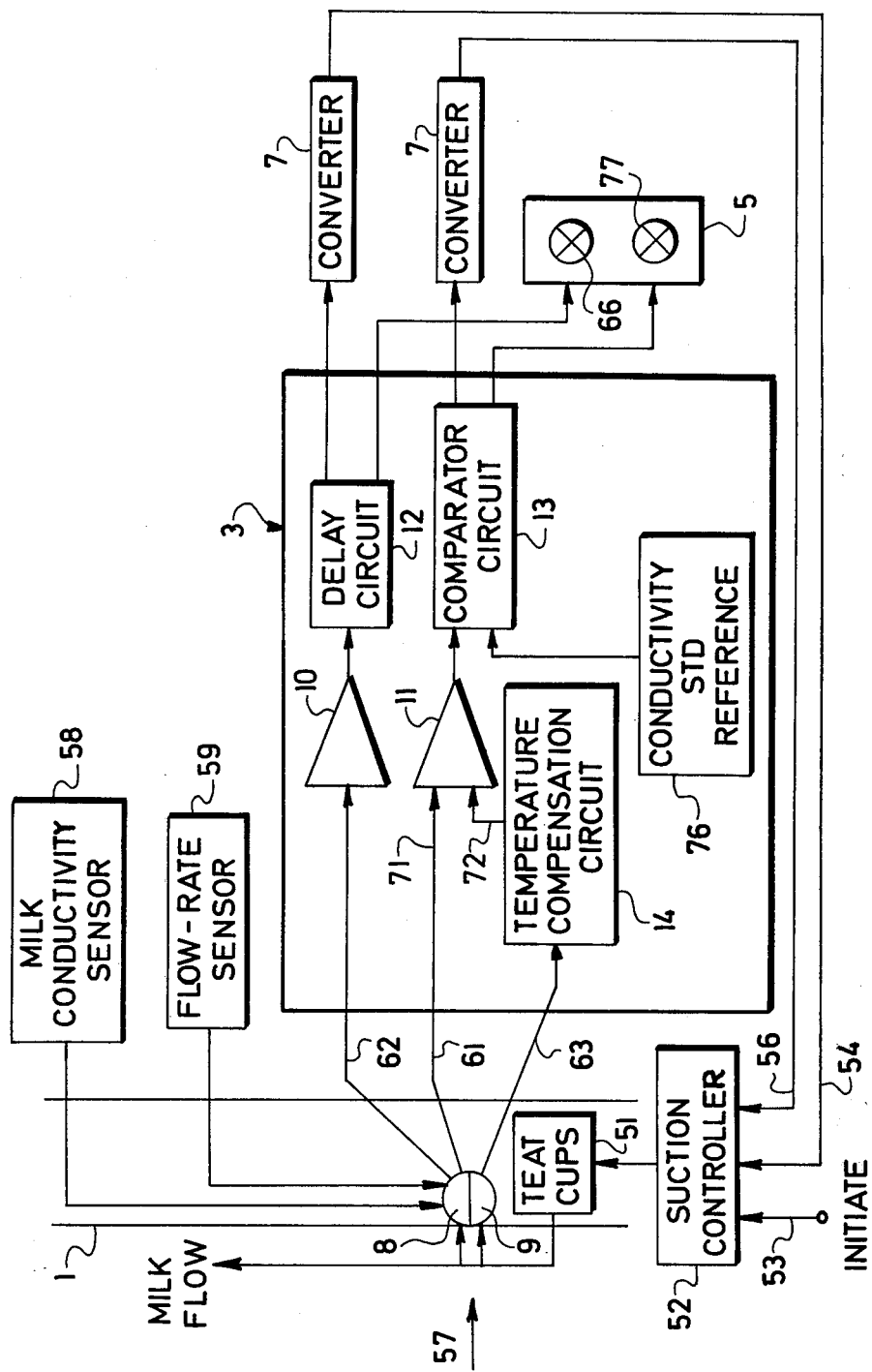

AUTOMATIC MILKING SYSTEMS

BACKGROUND OF THE INVENTION

The invention relates to automatic milking systems of the type having a plurality of suction-controlled teat cups that are securable to the milk glands of an animal.

In known systems of this type, the termination of suction on the teat cups is regulated in accordance with changes in the quality and/or quantity of the milk flowing from the animal after suction on the teat cups is initiated. For example, the system may be arranged so that the suction is terminated upon the occurrence of an undesired change in the milk flow rate, the electrical conductivity, or other quantity indicative of physical changes in the animal or of her milk content.

Up to now, such systems have required large and complex assemblies which are subject to early malfunction and failure, in addition to being costly to maintain and repair. Moreover, such systems have required the assistance of highly-trained operators who continually visually check the quality of successive batches of the milk, especially during the highly-critical initial ejection phase, where manual spilling of the milk for inspection has also been commonplace.

SUMMARY OF THE INVENTION

Such disadvantages are overcome with the facilities constructed in accordance with the invention for use with an automatic milking system. A multiple detector is coupled to the suction-operated teat cups for separately generating first, second and third electrical output signals which are individually indicative of (1) the milk flow rate, (2) the instantaneous electrical conductivity of the milk and (3) the temperature of the milk flow. The signal representative of the milk flow is coupled to a sub-assembly including a threshold-operated amplifier and a delay circuit. These latter two components cooperate to yield an output control pulse during suction on the teat cups only when the milk flow from the animal has diminished naturally, and blocks any pulses indicative of transient diminution of such milk flow caused by habitual starts of the animal while being milked. Such delayed control pulse is applied to the suction regulator for the teat cups to terminate the suction.

The second and third output signals from the multiple detector are used to generate a temperature-compensated signal indicative of the electrical conductivity of the flow, and for this purpose are associated with a compensating circuit and an operational amplifier. The output of the operational amplifier is applied to a first input of a comparator circuit, whose other input is coupled to a reference signal indicative of a desired range of conductivity. When the compensated conductivity signal falls outside the range, the comparator circuit likewise outpulses a control indication to the suction control means for terminating the suction on the teat cups.

In order to inform the attendant of undesired changes in the quality of the milk due, e.g., to the occurrence of an electrical conductivity value outside the prescribed range, the output of the comparator circuit is also coupled to a suitable alarm circuit, which may either be of the audible or visual type. Preferably, the output of the delay circuit is also coupled to a different portion of the alarm means, so that an operator can also be notified of the occurrence of non-transient drops in the milk flow rate.

With the inventive arrangement, no separate visual checks of the operation of the milking system are required, while at the same time a positive automatic indication of undesirable changes in quantity and quality is assured. Also, the arrangement prevents the premature termination of suction in response to normal reflexes of the animal, while at the same time permitting a timely cessation of suction to prevent damage to the milk gland when no additional milk is available.

BRIEF DESCRIPTION OF THE DRAWING

The invention is further set forth in the following detailed description taken in conjunction with the appended drawing, in which the single FIGURE is a combined block and schematic diagram of an automatic milking system constructed in accordance with the invention.

DETAILED DESCRIPTION

Referring now to the drawing, the numeral 1 represents a conventional milking track on which a plurality of conventional, suction-operated teat cups represented at 51 are affixed to the udders (not shown) of an animal to be milked using the facilities of the present invention. A conventional suction controller 52 is associated with the cups 51 for initiating and terminating suction on the cups 51 at the start and conclusion of the milking operation. In particular, the regulator is adapted to start suction upon the receipt of a "start" signal applied thereto over a line 53, and is adapted to terminate the suction upon the application thereto of a terminating signal on one of a pair of lines 54, 56, described below.

The flow of milk from the animal through the cups 51 after suction is initiated by the controller 52 is sensed by a multiple detector 57. Such detector, which is operative during the initial ejection of milk by the animal as well as later stages of the milking process, includes a first electrode section 8, which is associated with a conventional milk conductivity sensor 58 and milk flow-rate sensor 59. With such facilities, the electrode section 8 yields, on an output line 61, a first signal whose amplitude is indicative of the absolute conductivity of the then-flowing milk from the cups 51. In like manner, the electrode section yields, on an output line 62, a second signal whose amplitude is indicative of the instantaneous flow rate of the milk.

The multiple detector 57 also includes a second electrode section 9, which may take the form of a thermistor or the like for measuring the instantaneous temperature of the flowing milk. The section 9 has associated therewith an output line 63 bearing a third signal whose amplitude is proportional to the instantaneous temperature of the milk flow.

The first, second and third signals on the lines 61, 62 and 63 are individually routed to an electronic control unit 3 for generating control signals to terminate the suction of the controller 52 on the teat cups 51 when the flow rate and conductivity of the milk fall outside predetermined limits. In particular, the signal on line 62 indicative of flow rate is applied to the input of a threshold-operated amplifier 10, whose output is adapted to generate a control pulse during the time that the signal on the input line 62 falls below a predetermined value indicative of an excessively low flow rate of milk. Such control signal is employed to terminate the suction operation to prevent idle milking of the animal, and thereby damage to its milk glands, after its milk content has been substantially emptied.

Since the initiation of suction on the teat cups will habitually cause certain starts in the animal, leading to transient increases and drop-offs of milk flow, it is important for the milking apparatus to distinguish such transient drop-offs from the normal diminution of milk flow during the last part of the milking process. Otherwise, the control signal from the threshold device 10 will terminate suction of the cups 51 via the line 54 as described below before the animal has been emptied of milk.

In order to prevent this undesirable condition, and in further accordance with the invention, the output of the threshold device 10 is coupled to the input of a delay circuit 12, whose retardation time is adjusted to the maximum habitual transient interval of the animal. In this way, if the length of the control pulse generated at the output of the threshold device 10, and thereby the corresponding time that the signal on the line 62 is below a predetermined value indicative of a prescribed minimum flow rate, is less than the retardation time of the delay circuit 12 (thereby indicating a transient start of the animal), no signal will appear at the output of the delay circuit 12. Consequently, no suction-terminating signal is coupled to the controller 52 via the line 54, which is associated with the output of the delay circuit 12 as shown. By contrast, when the flow permanently diminishes at the end of the normal milking interval, the length of the pulse at the output of the threshold device 10 will be longer than the retardation time of the delay circuit 12, so that such delayed control pulse is applied to the controller 52 via the line 54 to terminate suction on the teat cups 51.

In order to permit monitoring of the progress of the milking process, the output of the delay circuit 12 is also applied to an associated audio or visual stage 66 of an alarm device 5 for monitoring by an attendant, if desired.

While the signal on the line 62 is adapted to control the suction on the teat cups 51 in accordance with the quantity of the flowing milk, the signals on the lines 62 and 63 are adapted to regulate suction on the basis of a parameter indicative of milk quality. It is well-known that certain changes in the conductivity of the flowing milk are indicative of undesired conditions, e.g., rut, of the animal.

In order to control the suction on the basis of this parameter, the conductivity signal on the line 61 is coupled to a main input 71 of an operational amplifier 11. The signal representative of milk temperature, appearing on line 63, is coupled to a correction input 72 of the amplifier 11 via a temperature compensation circuit 14. The purpose of the circuit 14 is to accommodate the temperature dependence of the absolute conductivity of the milk measured on the output line 61; in particular, the circuit 14 is arranged to translate the amplitude of the temperature signal on the line 66 in accordance with an analog conductivity-temperature curve programmed into the circuit 14 in a conventional manner, with the translated output from the circuit 14 being applied to the correction input 72 of the amplifier 11 as indicated. With this arrangement, the absolute conductivity signal on the line 61 is suitably and continually corrected by the amplitude on the line 72 so that the output of the amplifier 11 is an accurate indication of the conductivity of the flowing milk at any given temperature.

In order to terminate the suction of the cup 51 when the quality of milk falls below a prescribed conductivity standard set by a suitable reference generator 76, the corrected output of the amplifier 11 is applied to a first input of a conventional comparator circuit 13. The reference generator for the conductivity standard signal is applied to a second input of the circuit 13. The output of the comparator circuit is coupled to the suction termination line 56 leading to the controller 52. With this arrangement, when the difference between the corrected conductivity signal and the conductivity standard exceeds a predetermined value, the line 56 is energized to cause the controller 52 to remove suction from the cups 51.

It will be understood that the comparator circuit 13 may be provided with suitable threshold-operated facilities to inhibit an output therefrom when the difference between the corrected input signal and the conductivity standard is below the pre-set value indicative of marginal quality, or that alternatively a separate threshold circuit may be disposed in the line 56. In addition, it will be understood that the lines 54 and 56 need not be electric conductors but may involve facilities for the mechanical, pneumatic or hydraulic transmission of signals proportional to the outputs of the delay circuit 12 and the comparator circuit 13 to the associated inputs of the suction controller 52. In such cases, suitable electromechanical, electro-hydraulic or electro-pneumatic translating elements represented at 7 may be inserted in the lines 54 and 56 to convert the electrical pulses from the circuits 12 and 13 to the required quantities necessary for the controller 52.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an automatic milking system, a plurality of suction-operated teat cups securable to the milk glands of an animal to be milked, means coupled to the teat cups for initiating suction of the teat cups to start milk flow, detection means associated with the teat cups and rendered effective during the milk flow from the animal for providing a first signal proportional to the milk flow rate, threshold-operated means for yielding at its output a first control pulse when a signal applied to its input falls below a predetermined value, the duration of said first control pulse corresponding to the period over which said input signal remains below the predetermined value, means for applying the first signal to the input of the threshold means, delay means coupled to the output of the threshold means for inhibiting the passage of the first control pulse from the threshold means when such pulse does not exceed a predetermined interval, first control means coupled to the output of the delay means and rendered effective upon the passage of a delayed first control pulse for terminating the suction of the teat cups, first alarm means coupled to the output of the delay means, the detection means further comprising means rendered effective during the milk flow for individually generating second and third output signals having amplitudes individually proportional to the conductivity of the flowing milk and to the milk temperature, respectively, an operational amplifier having a main input and a correction input, means for applying the second output signal to the main input of the operational amplifier, means for applying the third output signal to the correction input of the operational amplifier, a comparison circuit having first and second inputs and an output exhibiting a second control pulse when the signals applied to the first and second inputs are outside a specified range, means for coupling the output of the operational amplifier to the first input of the comparison circuit, means for coupling a reference signal to the second input of the comparison circuit, and second control means coupled to the output of the comparison circuit and responsive to the generation of the second control pulse for terminating the suction of the teat cups.

2. A system as defined in claim 1, in which the means for coupling the third output signal to the correction input of the operational amplifier comprises means for compensating the amplitude of the third signal in accordance with a predetermined analog characteristic.

3. A system as defined in claim 1, further comprising second alarm means coupled to the output of the comparison circuit.

* * * * *